United States Patent Office 3,787,502
Patented Jan. 22, 1974

3,787,502
METHOD OF PURIFYING PETROLEUM-ORIGIN MERCAPTANS
Antonina Ivanovna Vorobeva, Pervomaiskaya, ulitsa 58, kv. 14, and Vera Mikhailovna Gorina, Kharkovskaya ulitsa 101, kv. 15, both of Ufa, and Roman Dmitrievich Obolentsev, deceased, and Vera Nikolaevna Sedova, Lenina ulitsa 84, kv. 28, Ufa, and Elena Romanovna Obolentseva, Rabochaya ulitsa 41, kv. 1, Saratov, and Natalia Romanovna Popodko, Lenina ulitsa 84, kv. 28, Ufa; said Sedova, Obolentseva, and Popodko also administrators for said Roman Dmitrievich Obolentsev, all of U.S.S.R.
No Drawing. Filed Nov. 18, 1970, Ser. No. 90,866
Int. Cl. C07c *149/04*
U.S. Cl. 260—609 R      5 Claims

ABSTRACT OF THE DISCLOSURE

A method of purifying mercaptans isolated from petroleum distillates, from the admixture of the aromatic and acid nature, in which mercaptans are treated with an aqueous alkaline solution to eliminate the acid-nature admixtures, then with an organic solvent inert with respect to mercaptans and selective for the aromatic admixtures to be eliminated. The instant method is instrumental in achieving 99-percent degree of purity of mercaptans. The purified mercaptans are effective substitutes for synthetic mercaptans.

---

This invention relates to a method of purifying mercaptans isolated from petroleum distillates, from the concomitant admixtures.

Mercaptans which are incorporated in petroleum distillates boiling down within 190–300° C. and have hitherto been considered as waste products of petroleum processing, can find an extensive application as polymerization modifiers in the production technology of synthetic rubber, organic glass and other kinds of polymers, wherein synthetic mercaptans are made use of at present.

Mercaptans isolated from petroleum distillates contain a considerable amount of impurities; thus, mercaptans isolated by the methanol-alkaline extraction, contain up to 20 percent admixtures which complicates the use of mercaptans in the abovesaid industries.

No methods of purifying petroleum-origin mercaptans are known to have been employed heretofore.

It is therefore an object of the present invention to provide a simple and efficacious method of purifying petroleum-origin mercaptans from the concomitant admixtures.

It is another object of the present invention to utilize mercaptans that are the waste products of petroleum processing.

Said objects have been accomplished due to the provision of a method of purifying mercaptans from admixtures which are mainly represented by aromatic and acid-nature hydrocarbons.

According to the present invention the method resides in that mercaptans isolated from petroleum distillates, are treated with an aqueous alkaline solution with the result that extraction of acid-nature admixture occurs followed by said admixtures passing into the alkaline layer.

Then mercaptans are separated from the alkaline layer and treated with an organic solvent selective for aromatic hydrocarbons but inert with respect to mercaptans with the result that the aromatic admixtures are extracted with the solvent to pass into the organic layer. The thus-purified mercaptans are separated from the organic layer and washed with water to eliminate the residual alkali and solvent.

As an extraction agent for acid-nature admixtures use can be made of aqueous solutions of sodium hydroxide, potassium hydroxide or other agents that exhibit alkaline properties such as sodium carbonate. However, the most suitable of the abovesaid alkaline agents is sodium hydroxide due to its being easily available and more efficacious in extraction. For extracting admixtures we recommend that use be made of the aqueous solutions of sodium alkali in a concentration of 7–10 wt. percent since the use of lower-concentration solutions fails to completely eliminate the admixtures, whereas solutions of a concentration above 10 wt. percent, though decreasing the amount of admixtures, at the same time result in higher solubility of mercaptans in the alkali so that when the concentration of the aqueous alkaline solution becomes in excess of 12 wt. percent a considerable part of mercaptans pass into the alkaline layer to form mercaptides as a loose white-colored sediment.

The treatment of mercaptans with 7–10 wt. percent aqueous alkaline solutions is to be made at a volumetric ratio of 1:1, the increase in the volumetric flow rate of the aqueous alkaline solution above the afore-mentioned ratio not significantly increasing the degree of purification.

The abovesaid alkaline treatment of mercaptans makes it possible to diminish the admixture content therein from 16–20 wt. percent down to 8–11 wt. percent.

Mercaptans thus purified from acid-nature admixtures, are subjected to treatment with an organic solvent as stated above, such as diethyleneglycol, dimethylsulphoxide, sulpholane, propylene carbonate or with any other solvent selective for aromatic hydrocarbons but inert with respect to mercaptans.

As a result the aromatic admixtures accompanying mercaptans pass into the organic layer and are eliminated.

To increase the selectivity of said solvents and to diminish the solubility of mercaptans in the solvents, water is added thereto, after which the water-diluted solvent is employed to extract aromatic admixtures. An optimum amount of water added to a solvent is 5–12 vol. percent.

The treatment of mercaptans with solvents may be made at various volumetric ratios but the most suitable is that in which 2–3 volumes of the solvent are employed to treat 1 volume of mercaptans.

At this stage of treatment 99 percent purity mercaptans are obtained.

Thus, the invention allows mercaptans isolated from petroleum distillates to be purified practically to the utmost degree of purity from admixtures of both an acid and aromatic nature.

Mercantans purified by the herein-disclosed method may be used as a polymerization modifier to substitute for synthetic mercaptans employed in the manufacture of synthetic rubber, organic glass and other polymer materials, as well as serving as a raw stock in the domain of organic synthesis.

Investigations have shown the molecular-weight distribution and physico-mechanical characteristics of synthetic rubber produced with the use of the thus-purified petroleum mercaptans as a plasticity modifier and with the use of synthetic dodecylmercaptan to be practically identical.

The invention is exemplified through the following specific embodiments of the method disclosed herein.

EXAMPLE 1

To a batch of 14.10 g. of mercaptans isolated by the methanol-alkaline extraction from a petroleum fraction boiling down within 180–300° C., and containing 16.5 wt. percent admixtures thereto; there are added thereto 8.75 g. of a 7-percent aqueous solution of sodium hydroxide. The mixture is vigorously stirred for 2 min., then settled down within 40 min. Acid-nature admixtures are extracted with alkali, the upper layer of mercaptans is separated from the aqueous-alkaline layer and is treated with a triple volumetric amount of dimethylsulfoxide to extract aromatic admixtures. Having been settled down within 1.5 hrs. the layer of mercaptans is separated from the organic layer, washed with distilled water to remove the traces of alkali and of the solvent, dried over calcinated sodium sulphate and filtered. The content of admixtures in purified mercaptans is not in excess of 1 percent.

EXAMPLE 2

Purification of mercaptans from the concomitant impurities is carried out by the method described above with reference to Example 1 with the sole exception that with a view to increasing the selectivity of dimethylsulphoxide and to diminishing the solubility of mercaptans in an organic solvent, the extraction of aromatic hydrocarbons proceeds with the addition of water in an amount equal to 9 vol. percent of dimethylsulfoxide, the ratio between mercaptans and the water-diluted solvent remaining at 1:3. The content of admixtures in purified mercaptans is not in excess of 1 percent.

EXAMPLE 3

Added to 10 ml. (9.18 g.) of mercaptans containing 16.5 wt. percent admixtures are 10 ml. of a 7-percent aqueous solution of sodium hydroxide; the resulting mixture is stirred within 2 min., settled down within 40 min. Then the bottom alkaline layer is drained off, while to the top layer of mercaptans there are added 27.6 ml. of diethyleneglycol and 2.4 ml. of water; the mixture is then stirred for 1 minute and settled down within 1.5 hrs. Upon separation of the layers mercaptans are washed with water to remove the traces of alkali and of the solvent, dried over calcinated sodium sulphate and filtered. The content of admixtures in purified mercaptans is not in excess of 1 percent.

What is claimed is:

1. A method of purifying petroleum-origin mercaptans which comprises treating mercaptans isolated from petroleum distillates with an aqueous alkaline solution at a concentration of 7 to 10 weight percent separating mercaptans from the alkaline layer and treating the mercaptans with an organic solvent selected from the group consisting of diethyleneglycol, dimethylsulfoxide, sulpholane and propylene carbonate separating the thus purified mercaptans from the organic layer and washing the purified mercaptans.

2. A method as claimed in claim 1, wherein the mercaptans are treated with an aqueous solution of sodium hydroxide.

3. A method as claimed in claim 1, wherein the mercaptans are treated with an aqueous alkaline solution at a volumetric ratio of 1:1.

4. A method as claimed in claim 1, wherein use is made of an organic solvent with the addition of water in an amount of 5–12 vol. percent of said solvent.

5. A method as claimed in claim 1, wherein the treatment with an organic solvent is carried out at a volumetric ratio of mercaptans to solvent equal to 1:3.

References Cited

UNITED STATES PATENTS

| | | | |
|---|---|---|---|
| 2,368,931 | 2/1945 | Leum et al. | 260—609 C |
| 2,422,826 | 6/1947 | Drennan | 260—609 C |
| 2,681,369 | 6/1954 | Hess et al. | 260—609 C |
| 3,225,105 | 12/1965 | Warner et al. | 260—609 C |
| 3,336,395 | 8/1967 | Price | 260—609 R |

LEWIS GOTTS, Primary Examiner

R. R. PHILLIPS, Assistant Examiner

U.S. Cl. X.R.

260—609 R